United States Patent
Weibel

(10) Patent No.: US 12,017,312 B2
(45) Date of Patent: Jun. 25, 2024

(54) CONTROL PANEL FOR A MACHINE TOOL

(71) Applicant: REISHAUER AG, Wallisellen (CH)

(72) Inventor: Reto Weibel, Flawil (CH)

(73) Assignee: REISHAUER AG, Wallisellen (CH)

(*) Notice: Subject to any disclaimer, the term of this patent is extended or adjusted under 35 U.S.C. 154(b) by 419 days.

(21) Appl. No.: 17/422,518

(22) PCT Filed: Feb. 20, 2020

(86) PCT No.: PCT/EP2020/054543
§ 371 (c)(1),
(2) Date: Jul. 13, 2021

(87) PCT Pub. No.: WO2020/173812
PCT Pub. Date: Sep. 3, 2020

(65) Prior Publication Data
US 2022/0088730 A1    Mar. 24, 2022

(30) Foreign Application Priority Data
Feb. 26, 2019 (CH) .................................. 00231/19

(51) Int. Cl.
*B23Q 1/00* (2006.01)
*B23F 23/12* (2006.01)
*G05B 19/409* (2006.01)

(52) U.S. Cl.
CPC ............ *B23Q 1/0045* (2013.01); *B23F 23/12* (2013.01); *G05B 19/409* (2013.01); *G05B 2219/36152* (2013.01)

(58) Field of Classification Search
CPC ..... B23F 23/12; B23Q 1/0045; G05B 19/409; G05B 2219/36133; G05B 2219/36152; G05B 11/00; G05B 9/00
See application file for complete search history.

(56) References Cited

U.S. PATENT DOCUMENTS

| 5,648,772 A | 7/1997 | Friedrich et al. |
| 2002/0104935 A1* | 8/2002 | Schweizer ........... B23Q 1/0045 409/134 |

(Continued)

FOREIGN PATENT DOCUMENTS

| CH | 303606 A | 12/1954 |
| DE | 641 223 C | 1/1937 |

(Continued)

OTHER PUBLICATIONS

International Search Report for PCT/EP2020/054543, dated Sep. 15, 2020.

(Continued)

*Primary Examiner* — Kidest Bahta
(74) *Attorney, Agent, or Firm* — Sughrue Mion, PLLC

(57) ABSTRACT

A control panel for a machine tool has a housing (1). The housing comprises a housing base part (2) and a housing front part (3). A display (19) and a control element panel (20, 21) are attached to the front part of the housing. In the region of the housing bottom side, the housing front part is connected to the housing base part by miter hinges so that it can be swiveled to provide access to the interior of the housing. Fold-out supports (13) make it possible to use an alphanumeric keyboard (15) for maintenance work. Indentations (5) on both sides of the housing rear allow the housing to be easily grasped. Control elements (18) are arranged in the indentations.

25 Claims, 4 Drawing Sheets

(56) References Cited

U.S. PATENT DOCUMENTS

| | | | | |
|---|---|---|---|---|
| 2005/0095074 | A1* | 5/2005 | Hacker | B23Q 11/0891 |
| | | | | 409/134 |
| 2008/0227554 | A1* | 9/2008 | Cole | G07F 17/32 |
| | | | | 463/46 |
| 2009/0050781 | A1* | 2/2009 | Seitz | B23Q 1/0045 |
| | | | | 248/637 |
| 2016/0343204 | A1 | 11/2016 | Maher et al. | |
| 2018/0297212 | A1 | 10/2018 | Kino | |
| 2019/0130521 | A1* | 5/2019 | Koizumi | H05K 7/20972 |

FOREIGN PATENT DOCUMENTS

| | | |
|---|---|---|
| DE | 88 09 861 U1 | 9/1988 |
| DE | 199 02 174 C1 | 7/2000 |
| DE | 19907134 C1 | 8/2000 |
| DE | 10 2012 102 749 A1 | 10/2013 |
| DE | 102014000789 A1 | 7/2015 |
| EP | 0 353 706 A2 | 2/1990 |
| EP | 0 525 531 A2 | 2/1993 |
| EP | 0 722 131 A2 | 7/1996 |
| EP | 1093092 B1 | 3/2007 |
| FR | 1.435.140 A | 4/1966 |
| JP | 6-65903 U | 9/1994 |
| JP | 2018-176359 A | 11/2018 |
| WO | 01/96969 A1 | 12/2001 |
| WO | 03/088011 A2 | 10/2003 |
| WO | 2007/025396 A1 | 3/2007 |
| WO | 2008/071669 A1 | 6/2008 |
| WO | 2018/200260 A1 | 11/2018 |

OTHER PUBLICATIONS

"Cylindrical Gear Technology—Complete Machining", Höfler TM 65 Brochure, Klingelnberg, Apr. 2020, pp. 2-15 (16 pages Total).
Wirz, "Continuous Generating Gear Grinding Machines and information from Industrial Practice", Reishauer, 2010, Chapter 6, pp. 453-475 (25 pages total).
Kistner Werkzeugmaschinen, "Trumpf Trubend 5230—CNC press brake / Abkantpresse—Kistner Werkzeugmaschinen" Online Youtube Video, 0:05~0:07 Accessed via the Internet: https://www.youtube.com/watch?v=bnQqNw-GQ9U.
Office Action dated Dec. 19, 2023 in Japanese Application No. 2021-549731.

* cited by examiner

CONTROL PANEL FOR A MACHINE TOOL

CROSS REFERENCE TO RELATED APPLICATIONS

This application is a National Stage of International Application No. PCT/EP2020/054543 filed Feb. 20, 2020, claiming priority based on Switzerland Patent Application No. 00231/19 filed Feb. 26, 2019 the entire contents of which are incorporated in their entirety.

TECHNICAL FIELD

The present invention relates to a control panel for a machine tool, in particular for a gear cutting machine, and to a machine tool equipped therewith.

PRIOR ART

For the control of machine tools, it is common to provide a control panel on the machine tool. The control panel often has a display in an upper area, which can be designed as a touch display. In a lower area of the control panel, there is often a separate panel with a multitude of control elements, e.g. individual keys, keypads, joysticks, rotary knobs, a key switch, an emergency stop button, etc. The control elements are used to set up the machine for a particular machining task and to subsequently control the machining operation.

Depending on the application, it may be desirable to arrange the control panel movably, in particular pivotably and/or height-adjustably, on the machine tool. It is also desirable to design the operation concept of the control panel in such a way that certain operations cannot be triggered accidentally, in particular safety-relevant operations.

For maintenance purposes, it is desirable that a separate alphanumeric keyboard is provided to allow normal text input. However, such a keyboard is superfluous or even annoying during normal operation. In EP 0 525 531 A2, it was therefore proposed to provide a keyboard that can be inserted into a control panel. However, this requires a relatively large amount of space.

For maintenance purposes, it is also desirable to make the inside of the control panel easily accessible. However, the display and the panel with the control elements are not always arranged in a common plane; it is also known to arrange the panel with the control elements inclined towards the display to improve ergonomics. Examples are given in DE 88 09 861 U1 and EP 0 722 131 A2. In this case, it is associated with certain challenges to create an easy access to the inside of the control panel.

PRESENTATION OF THE INVENTION

In a first aspect, it is an object of the present invention to provide a control panel that allows the control panel to be moved relative to the machine tool, in particular pivoted and/or adjusted in height, in a particularly ergonomic manner.

Thus, a control panel for a machine tool, in particular for a gear cutting machine, is disclosed. This control panel comprises:
 a housing defining a housing interior and defining a housing front, a housing rear, two lateral housing sides, a housing bottom side, and a housing top side;
 a display located on the housing front; and
 a control element panel, also located on the housing front, with control elements for the machine tool.

The housing rear has indentations on both sides in the region of the lateral housing sides. The housing has a reduced thickness (depth) of preferably 50 to 70 mm where the indentations are located to make it easier for the user's hands to grip around the side of the housing.

Frequently, so much space is required inside the housing of the control panel that the required housing thickness (measured between the housing front and the housing rear) is so large that the housing would no longer allow ergonomic gripping around. By providing indentations in the housing rear, the present invention enables ergonomic gripping around without limiting the available volume inside the housing. In a region located between the indentations, the housing may have any thickness. In particular, the housing may be more than 30 mm, more than 50 mm or even more than 70 mm thicker (deeper) in this region than in the region of the indentations.

The control panel may comprise at least one further control element, in particular at least one button, which are arranged in one of the indentations. Preferably, this further control element points in a direction opposite to the control element panel, i.e. to the rear. Preferably, at least one such further control element is present in each of the indentations. The further control element can be, for example, an enabling switch for two-hand operation or a height adjustment key. Due to the arrangement in the indentations, these further control elements can be reached ergonomically. Also, due to the rear arrangement, two-hand operation can be enforced in a particularly tamper-proof manner. Furthermore, accidental actuation of the other control elements is prevented.

The control panel may comprise a mounting bracket for attachment to the machine tool. In particular, the attachment can be made via a carrying arm or a carrying column. The mounting bracket is preferably arranged in an area located between the indentations on the housing rear and defines a vertical mounting axis. Preferably, the mounting bracket is configured to allow the control panel to pivot about the vertical mounting axis. To this end, the mounting bracket may include a swivel bearing that allows pivotal movement of the control panel about the vertical mounting axis. The swivel bearing is preferably arranged so that the swivel axis does not intersect the housing anywhere. This makes it easier to mount the control panel either hanging or resting on the machine tool.

To improve ergonomics, the display is preferably inclined upwards relative to the vertical mounting axis, preferably by an angle of inclination of 5° to 15° relative to the vertical. The control element panel is preferably arranged below the display and is preferably inclined upwards relative to the vertical mounting axis by a greater angle than the display, in particular by an angle of inclination of 25° to 35°. The angle between the planes of the display and the control element panel is preferably 10° to 30°, in particular 15° to 25°.

At least one connector housing (in particular a socket) for an electrical plug connection can be provided on the housing rear, the connector housing preferably being arranged laterally offset from the vertical mounting axis. This arrangement provides protection against mechanical damage or accidental tearing of a plug from the connector housing.

In a second aspect, the present invention provides a control panel that allows an alphanumeric keyboard to be placed on the control panel when required without the support elements required for this purpose interfering with normal operation.

For this purpose, the control panel comprises at least one support, preferably two supports, for an alphanumeric keyboard. The supports can be designed as arms. They are arranged in the region of the housing bottom side and can be pivoted horizontally (i.e. about a vertical or at least almost vertical axis) between an unfolded position and a folded position. In the unfolded position, the respective support protrudes forward beyond the housing front in such a way that the keyboard can be placed on it. In the folded position, however, the support preferably does not protrude forward beyond the housing front. This allows the user to pull the control panel closer to him/her, thus reducing input distances and improving ergonomics. In addition, where space is limited around the machine, the user and third parties can move around more easily.

In order to fix the respective support in a clamping manner in the unfolded position and in the folded position, the control panel may comprise at least one rotary knob arranged in the region of the housing bottom side. Preferably, the support has an anti-slip coating at least on its upper side, for example made of synthetic rubber.

In order to be able to adjust the control panel with one hand, it may comprise a horizontal handle in the region of the housing bottom side. In particular, the handle can be designed in a known manner as a bridge handle, both ends of which are connected to the housing front. To prevent the handle from colliding with the keyboard support, the handle is preferably arranged on the housing front in the region of the housing bottom side in such a way that the support can be pivoted below the handle between the unfolded position and the folded position.

In order to be able to stow away the keyboard when not in use, the control panel may comprise an accessory container, which is arranged on the housing rear and is designed to receive the keyboard. In the simplest case, the accessory container forms a bulge. However, it may also have a more complex design and, in particular, be closed on five sides. To remove the keyboard, the accessory container may have a side access opening. The latter may be open or may be closable by a suitable lid.

Accordingly, the control panel may also comprise an alphanumeric keypad, which may optionally be receivable in the accessory container or placeable on the unfolded supports.

If the housing rear has indentations on both sides in the region of the lateral housing sides, as described above, it is advantageous for the accessory container to be arranged in an area of the housing rear located between the indentations.

In a third aspect, it is an object of the present invention to provide a control panel whose interior is particularly well accessible for maintenance purposes.

For this purpose, the control panel comprises:
a housing defining a housing bottom side;
a display; and
a control element panel with control elements for the machine tool.

The housing comprises a housing base part and a housing front part, which together delimit a housing interior. The display and the control element panel are attached to the housing front part. The housing front part is pivotably connected to the housing base part in the region of the housing bottom side via at least one hinge in order to pivot the housing front part about a horizontal axis between a closed position and an open position relative to the housing base part.

This makes the housing interior accessible for maintenance work in a particularly simple and ergonomic way. By folding out the housing front part together with the display and the control panel to the front, the interfaces of these parts and of other components attached to the housing front part are easily visible and accessible. Foreign substances such as operating fluids and chips can drip or fall off the folded-down front part of the housing in the open position without entering the housing interior.

Preferably, the hinge that pivotally connects the housing front part to the housing base part is designed as a miter hinge. Preferably, there are two miter hinges connecting the housing front part and the housing base part. The use of miter hinges makes it possible for all hinge parts to be located inside the housing in the closed position and not visible from the outside. This reduces the risk of damage and also enables an aesthetically pleasing design. The use of miter hinges also enables improved sealing between the housing base part and the housing front part.

To limit the maximum opening angle between the housing front part and the housing base part, the control panel preferably comprises at least one flap stay arranged between the housing base part and the housing front part. Preferably, there are two flap stays which are arranged opposite each other in the region of the two lateral housing sides in the housing interior. The maximum opening angle is preferably 50° to 70°.

The proposed method of connecting the housing front part to the housing base part is particularly advantageous if the control element panel is inclined relative to the display. In particular, it is advantageous from an ergonomic point of view if the control element panel is arranged below the display and is inclined towards the display, preferably by an angle of 10° to 30°, in particular 15° to 25°. In this case, for example, an alternatively conceivable design of the housing front part as a door which can be pivoted about a vertical axis is associated with design disadvantages which are avoided by the proposed type of connection.

To prevent ingress of foreign substances, the control panel may comprise a seal that is effective between the housing base part and the housing front part in the closed position. It may be completely or at least partially circumferential.

Preferably, the seal runs completely inside the housing so that it is not visible from the outside in the closed position and is protected from damage. For this purpose, it is advantageous if a profile is arranged in the housing interior which supports the seal in such a way that the seal runs in the housing interior at a distance from a casing wall of the housing. Preferably, the profile is attached to the housing base part for this purpose, in particular to its casing wall. The profile diverts foreign substances that penetrate through the gap between the housing front part and the housing base part in such a way that they may get out again on the bottom side of the housing.

To fix the housing front part in the closed position on the housing base part, the control panel may comprise at least one housing lock. Preferably, a sash lock is used here which can be pivoted by means of an actuating element. A housing lock which has a pivotable closing lever inside the housing is referred to as a sash lock. The closing lever is brought into or out of engagement with a corresponding counterpart by a pivoting movement. The closing lever and the counterpart can be designed in such a way that the housing front part is increasingly pressed in the direction of the housing base part when the engagement is established. For example, the counterpart can have an inclined plane on which the closing lever slides, or vice versa. This results in a pretensioning of the circumferential seal. The actuating element is preferably designed so that it can be actuated only by authorized personnel. It is advantageous if the actuating element is arranged on the outside on the rear of the housing base part facing away from the housing front part, where it is optimally protected against damage.

The various aspects of the invention may each be implemented individually or combined with each other as desired.

The invention further provides a machine tool, in particular a gear cutting machine, having a control panel of the foregoing type.

BRIEF DESCRIPTION OF THE DRAWINGS

Preferred embodiments of the invention are described below on the basis of the drawings, which are for explanatory purposes only and are not to be interpreted as limiting. In the drawings

FIG. 2 shows a rear view of the control panel of FIG. 1 with the support arms folded in;

DESCRIPTION OF PREFERRED EMBODIMENTS

FIGS. 1 to 6 show various views of a control panel according to an embodiment.

Figure 1:
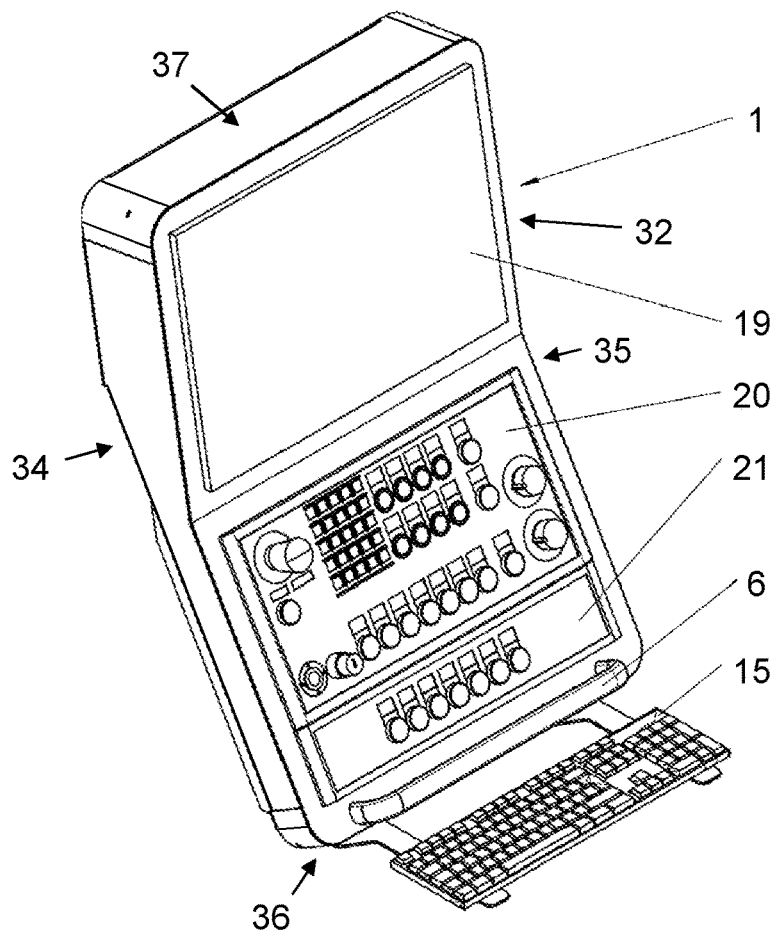
FIG. 1 shows a perspective view of a control panel with keyboard on unfolded support arms.

As can be seen from FIG. 1, the control panel has a housing 1 defining a housing front 32, a housing rear 33, a left lateral housing side 34, a right lateral housing side 35, a housing bottom side 36 and a housing top side 37. A display 19 in the form of a touch display is arranged on the housing front 32. A control element panel 20 and an additional control element panel 21 are arranged below the display 19. The control element panels 20, 21 contain a plurality of control elements, including various individual keys, a keypad, rotary knobs, a key switch and a joystick. By means of a bridge-shaped handle 6, the control panel is pivotable relative to a machine tool not shown and, if necessary, adjustable in height.

The control element panels 20, 21 are located in a common plane. Both the plane of the display 19 and the plane of the control element panels 20, 21 are inclined relative to the vertical towards the top. The plane of the control element panels 20, 21 is more inclined relative to the vertical than the plane of the display 19. The angle of inclination ε between these planes is 20° in the present example (see FIG. 5).

The entire housing front 32 has no recesses. Hence, foreign matter such as operating fluids or chips can flow off or fall off and cannot accumulate.

Figure 2:
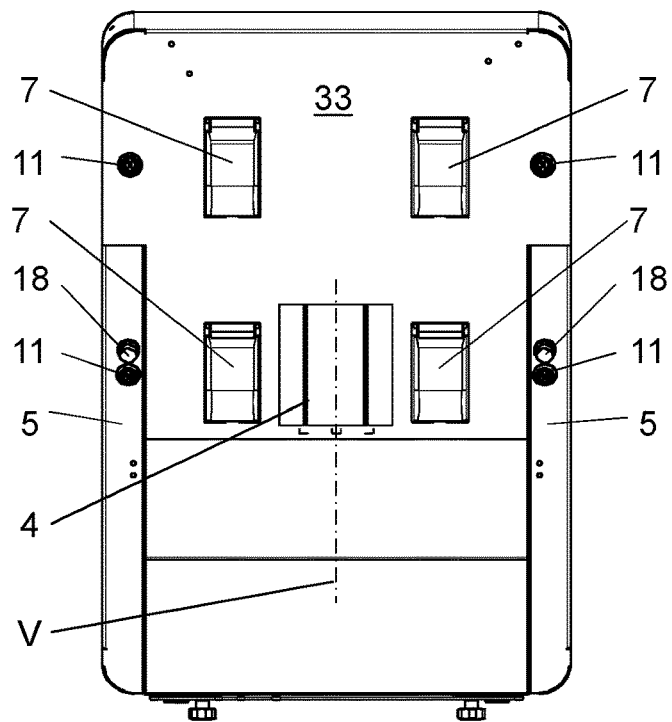
Figure 5:
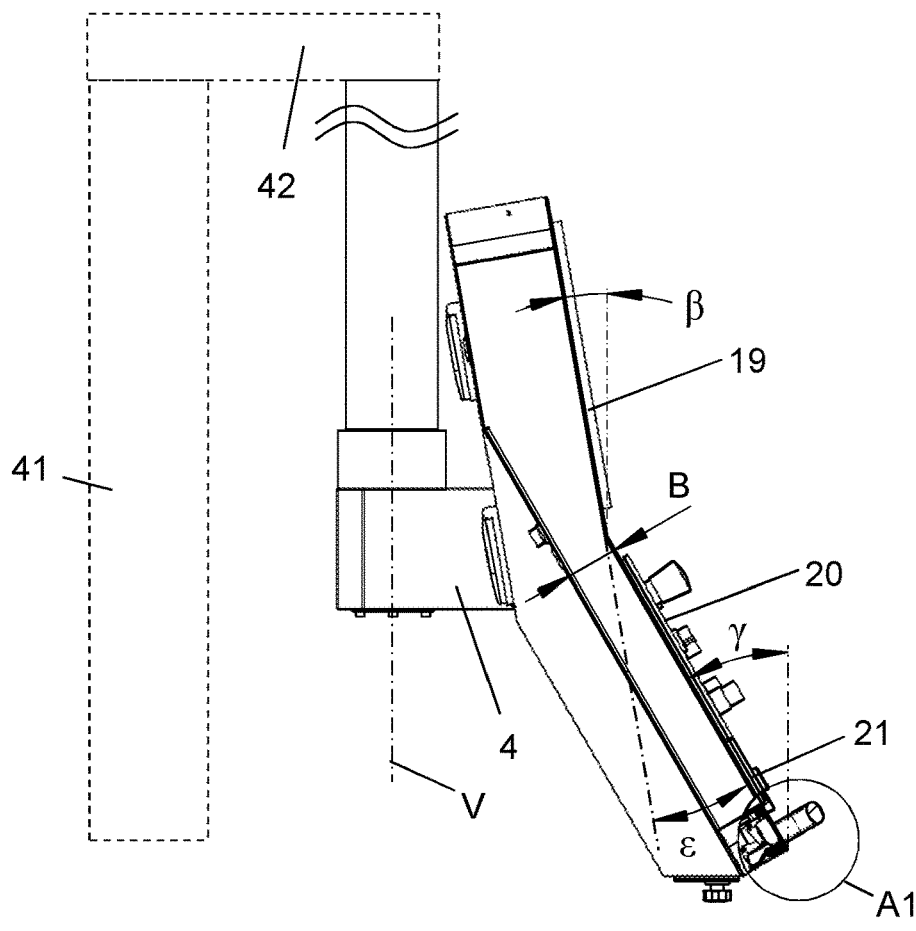
FIG. 5 shows a side view of the control panel of FIG. 1 with the support arms folded in and a schematically shown carrying arm on a machine tool.
Figure 6:
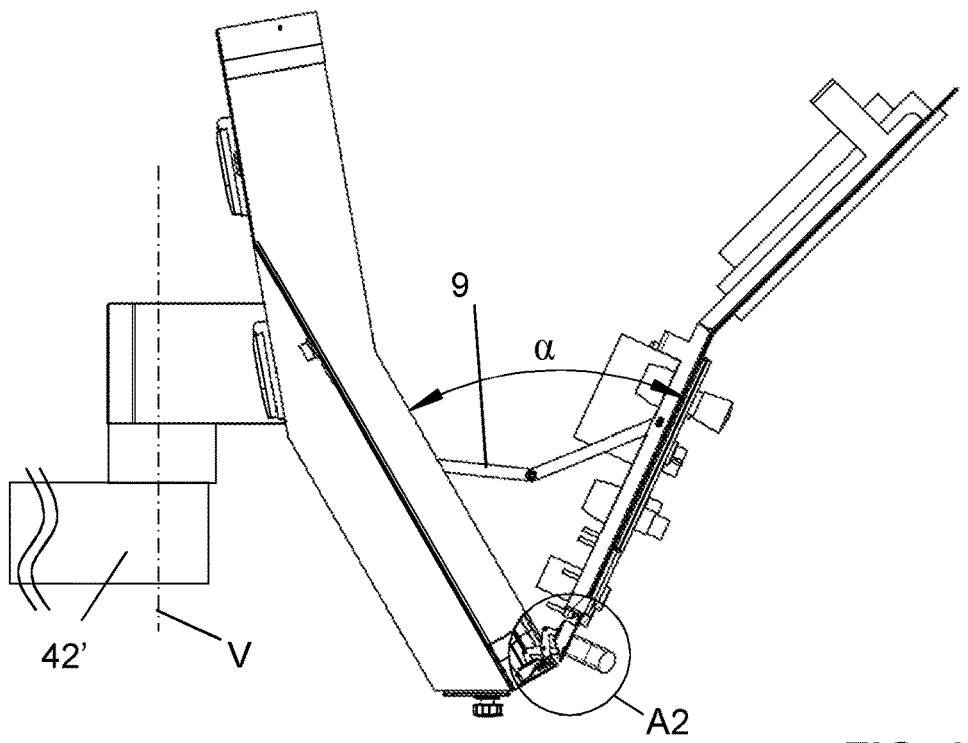
FIG. 6 shows a side view of the control panel of FIG. 1 with folded-in support arms, unfolded front side and a schematically shown alternative carrying arm on a machine tool.

As can be seen in FIG. 2, a mounting bracket 4 is arranged on the housing rear 33 in order to mount the control panel hanging or resting on a carrying arm (see schematically illustrated carrying arms 42, 42' in FIGS. 5 and 6). The mounting bracket 4 defines a vertical mounting axis V. The control panel can be pivoted horizontally relative to the carrying arm 42, 42' about the vertical mounting axis V. For this purpose, the mounting bracket 4 has a swivel bearing known per se. Also on the housing rear 33 are a plurality of connector housings 7 for connecting electrical cables. The connector housings 7 are arranged laterally offset with respect to the mounting axis V. In operation, the connector housings and the cables connected thereto are located in an area between the machine tool and the housing 1 of the control panel that cannot be walked on. This greatly reduces the risk of the cables being torn off or stripped, and the overall depth of the housing of the control panel can be kept small.

Figure 3:
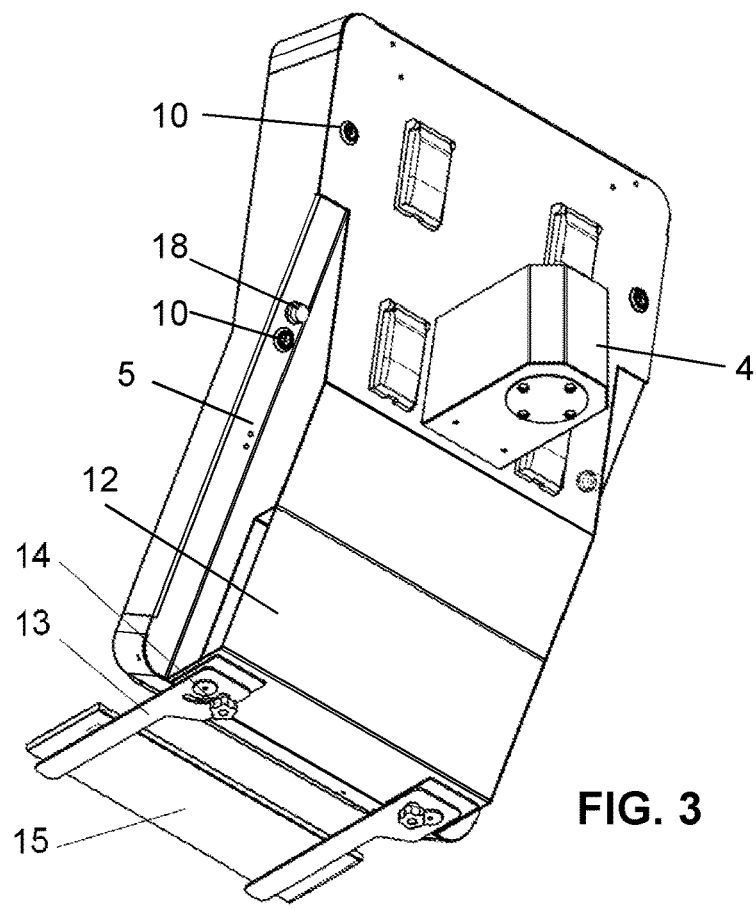
FIG. 3 shows a perspective rear view of the control panel of FIG. 1 with keyboard on the unfolded support arms.

As can be seen particularly well in FIG. 3, the housing has indentations 5 on both sides on its rear side. In the region of these indentations 5, the thickness (depth) of the housing is reduced compared to the adjacent areas. The thickness in the region of the indentations is selected in such a way that the housing in this area can be easily grasped by the hand of a user, e.g. to swivel or adjust the height of the control panel. This thickness B (see FIG. 5) is preferably 50 to 70 mm. The width of the indentations in the transverse direction is also preferably at least 50 mm, so that the user can grip the control panel securely. Between the indentations, the housing protrudes in the thickness direction by up to 80 mm in the present example.

At least one control element 18 is arranged in each of the two indentations 5. This control element can be used, for example, to control an adjustment drive for height adjustment. Instead of or in addition to this, it can e.g. also be an enabling key which must be pressed simultaneously with another key, e.g. in one of the control element panels 20, 21, in order to select a specific operation. In this way, two-hand operation can be enforced. The indentations 5 allow the control elements 18 to be reached in a particularly ergonomic manner. Accidental actuation of the control elements 18 is virtually impossible.

Figure 4:
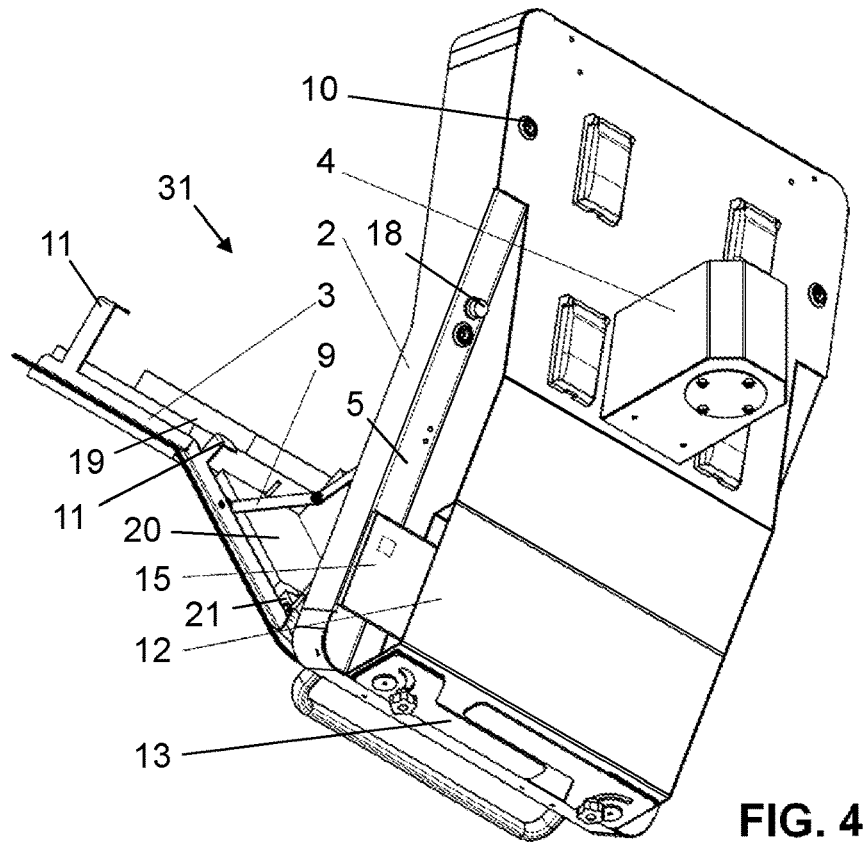
FIG. 4 shows a perspective rear view of the control panel of FIG. 1 with the support arms folded in and the front side unfolded.

As can be seen in particular in FIG. 4, the housing comprises two parts, namely a housing base part 2 and a housing front part 3, which together with the display 19 and the control element panels 20, 21 delimit the housing interior. The housing front part 3 forms a frame on which the display 19 and the control element panels 20, 21 are mounted. The housing front part 3 can be pivoted relative to the housing base part 2 about a horizontal axis extending in the region of the housing bottom side from the closed position of FIG. 3 to the open position of FIG. 4 in order to provide access to the housing interior 31. The maximum opening angle is limited by flap stays 9 attached on both sides.

In the closed position of FIG. 3, the housing front part 3 is fixed to the housing base part 2 by housing locks 10. The housing locks are designed as lever locks (sash locks). For this purpose, each housing lock comprises a rotatable actuating element arranged on the outside on the rear side of the housing base part and a lock lever rigidly connected thereto and arranged on the inside. By rotating the actuating element, the closure lever can be brought into or out of engagement with a holding arm 11 which extends from the housing front part 3 into the housing interior 31 (see FIG. 4). The actuating elements are designed in such a way that they can only be actuated with the aid of special means (e.g. a key or a specially designed bit insert), so that only authorized service personnel can open the housing.

Two support arms 13 for a keyboard 15 are mounted on the underside of the housing. The support arms can be swiveled horizontally between an unfolded position (see FIG. 3) and a folded position (see FIG. 4). In both the unfolded and folded positions, each support arm 13 can be fixed by clamping with a rotary knob. The rotary knob may, for example, be rigidly connected to a screw which can be screwed into the underside of the housing to produce the clamping effect, or form a nut which can be screwed onto a short threaded rod, the threaded rod being rigidly fixed to the underside of the housing. In the unfolded position of FIG. 3, the support arms 13 protrude horizontally beyond the housing front, thereby permitting the keyboard 15 to be placed thereon. For this purpose, at least on their upper side, the support arms may be provided with an anti-slip coating, e.g. made of synthetic rubber. In the folded position of FIG. 4, however, the support arms 13 do not protrude forward and thus do not occupy any additional space between the housing 1 of the control panel and the user. The user can thus pull the control panel closer to him/her and there is no danger of getting his/her clothing caught on one of the support arms.

The keyboard can for example be connected to the control panel via a USB interface. To safely store the keyboard 15 when not in use, the control panel has an accessory container 12 on its rear side. This accessory container is large enough to receive the keyboard 15 and, if necessary, other accessories or a service book. The accessory container is open to the side to allow the keyboard 15 to be removed. Optionally, a lid, not shown, can be provided to close the accessory container and thus protect its contents from contamination by operating fluids or chips.

FIG. 5 schematically illustrates the attachment of the control panel to a machine tool. In the present example, the control panel with its mounting bracket 4 is suspended from a carrying arm 42, which is shown only very schematically and is attached to a machine tool 41, which is also shown only very schematically. The control panel can be pivoted about the vertical mounting axis V by means of the swivel bearing already mentioned. The plane of the display is inclined with respect to the vertical mounting axis V towards the top by a first inclination angle β of preferably 5 to 15°. The plane of the control element panels 20, 21 is inclined with respect to the vertical mounting axis V towards the top by a second inclination angle γ of preferably 25° to 35°. The angle of inclination ε between the display 19 and the control element panel 20 is preferably 10° to 30°. These inclination angles ensure particularly ergonomic data input and data perception according to DIN-EN 1005-4:2005+A1:2008.

FIG. 6 shows the control panel again in the open state. It can be seen particularly well here how the flap stays 9 limit the opening angle α of the housing front part relative to the housing base part. The maximum opening angle α is preferably 50 to 70°. In addition, FIG. 6 schematically illustrates how the control panel can alternatively be mounted resting on a carrying arm 42'. In this case, too, the control panel can be pivoted about the vertical mounting axis V.

Figure 7:
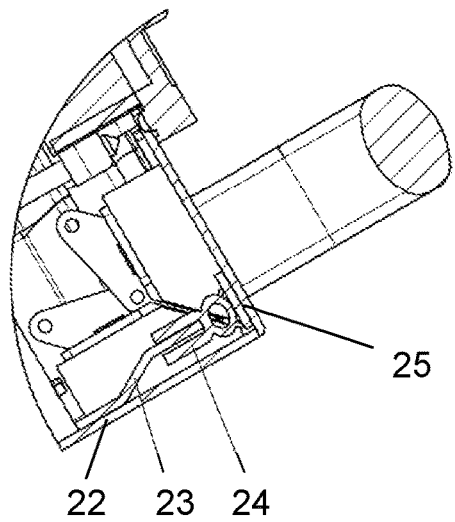
FIG. 7 shows an enlarged view of area A1 of FIG. 5.

As can be seen particularly well from FIG. 7, the control panel has a partially circumferential seal 24 which cooperates with a circumferential sealing support 25. The seal 24 is fitted onto a profile 23 which is shaped and fastened to the casing wall 22 of the housing base part 2 in such a way that the seal 24 extends inside the housing at a predetermined distance from the casing wall 22. The sealing support 25 is attached to the inside of the housing front part. In this way, the seal is protected from damage. Foreign substances can flow out downwards in the area between the profile 23 and the casing wall 22. In the area of the miter hinges 8 described below, the seal 24 is interrupted. In this area, however, additional sealing elements not shown in the drawing are provided to ensure an overall continuous sealing of the housing interior.

Figure 8:
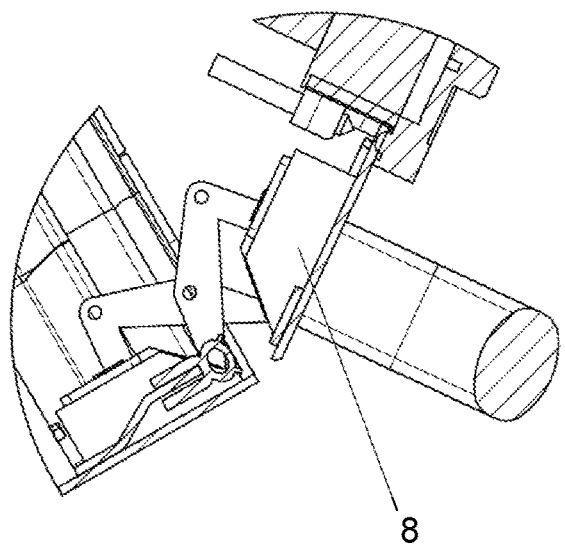
FIG. 8 shows an enlarged view of area A2 of FIG. 6.

As can be seen particularly well from FIG. 8, the pivotable connection between the front part of the housing and the base part of the housing is made with so-called miter hinges 8. Miter hinges are frequently used in furniture construction in order to be able to open and close a door which miters with a side panel of a piece of furniture. A miter hinge allows a pivoting movement around a virtual pivot axis that runs outside the piece of furniture, although all parts of the miter hinge are located inside the piece of furniture.

Figure 9:
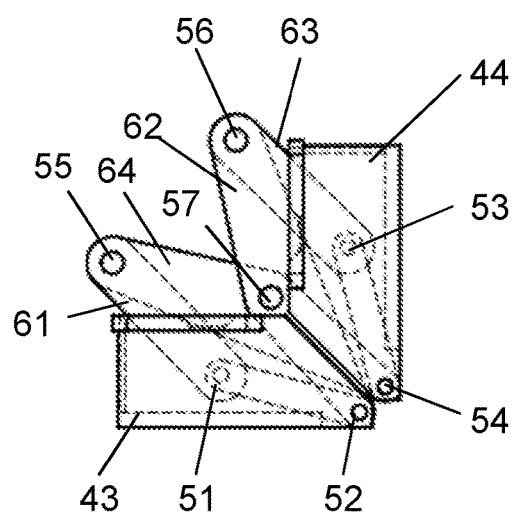
FIG. 9 shows a functional sketch of a miter hinge in the closed state.
Figure 10:
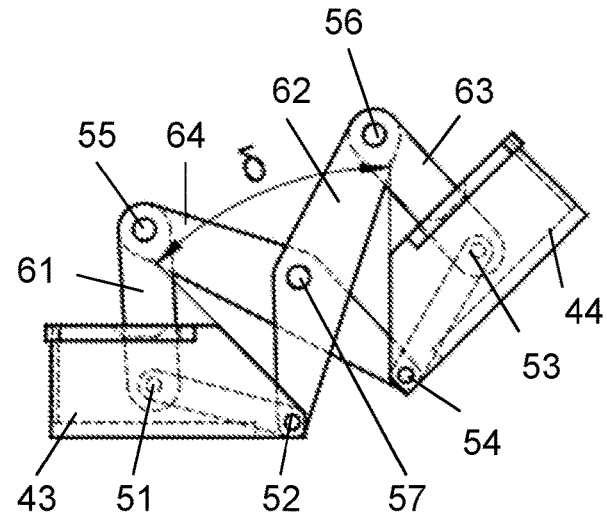
FIG. 10 shows a functional sketch of the miter hinge in a partially opened state with an opening angle δ.

FIGS. 9 and 10 explain the structure of a miter hinge, which is used here generally to connect a movable part 44 to a fixed part 43. The miter hinge, which is known per se, has seven parallel axes 51 to 57 which are connected to one another by four arms 61 to 64. The first and second axes 51, 52 are offset from each other on the fixed part 43. The first arm 61 is pivotable about the first axis 51, the second arm 62 about the second axis 52. The third and fourth axes 53, 54 are offset from each other on the movable part 44. The third arm 63 is pivotable about the third axis 53, the fourth arm 64 about the fourth axis 54. The first and fourth arms 61, 64 are connected at their free ends by the fifth axis 55. The second and third arms 63, 64 are connected at their free ends about the sixth axis 56. The second and fourth arms 62, 64 cross each other. They are connected in their crossing area via the seventh axis 57. This construction results in a forced guidance of the movable part with respect to the fixed part, which leads to a pivoting movement of the movable part about a virtual pivot axis.

The combination of miter hinges and flap stays allows the front part of the housing 3 to be swiveled down to a safe end position for service access. This opening allows ergonomic service access and a view on the interfaces of the installed components. Foreign substances can still drip or fall off without entering the interior. The miter hinges allow the front part of the housing to be hinged without visible fasteners, providing greater protection against tampering and a higher level of tightness.

The invention claimed is:

1. A control panel for a machine tool, the control panel comprising:
    a housing defining a housing interior and defining a housing front, a housing rear, two lateral housing sides, a housing bottom side, and a housing top side, wherein the housing rear has indentations on both sides along the lateral housing sides, the housing having a reduced thickness where the indentations are located in order to facilitate lateral gripping around the housing;
    a display located on the housing front;
    a control element panel, also located on the housing front, with control elements for the machine tool, and
    a mounting bracket for fixing the control panel to the machine tool, the mounting bracket being arranged in an area located between the indentations on the housing rear and defining a vertical mounting axis.

2. The control panel of claim 1, comprising at least one further control element arranged in at least one of the indentations.

3. The control panel of claim 2, wherein the further control element points in a direction opposite to the control element panel.

4. The control panel of claim 1, wherein the control element panel is arranged below the display and is inclined towards the display.

5. The control panel of claim 1, wherein the mounting bracket comprises a swivel bearing which allows pivotal movement of the control panel about the vertical mounting axis.

6. The control panel of claim 1, comprising at least one connector housing for an electrical plug connection arranged on the housing rear laterally offset from the vertical mounting axis.

7. The control panel of claim 5, wherein the vertical mounting axis does not intersect the housing anywhere.

8. A control panel for a machine tool, the control panel comprising:
- a housing defining a housing interior and defining a housing front, a housing rear, two lateral housing sides, a housing bottom side, and a housing top side;
- a display located on the housing front;
- a control element panel, also located on the housing front, with control elements for the machine tool; and
- at least one support for an alphanumeric keyboard, the support being arranged proximate to the housing bottom side and being horizontally pivotable between an unfolded position and a folded position, the support in the unfolded position protruding beyond the housing front in such a way that the keyboard can be placed on it.

9. The control panel of claim 8, wherein the control panel comprises at least one rotary knob which is arranged in the region of the housing bottom side and with which the support can be fixed in the unfolded position and in the folded position by clamping.

10. The control panel of claim 8, wherein the support has an upper side and an anti-slip coating at least on said upper side.

11. The control panel of claim 8, comprising a horizontal handle,
wherein the handle is arranged on the housing front in the region of the housing bottom side in such a way that the support is pivotable below the handle between the unfolded position and the folded position.

12. The control panel of claim 8, wherein the control panel comprises an accessory container arranged on the housing rear and configured to receive an alphanumeric keyboard.

13. The control panel of claim 12, wherein the accessory container has a side access opening.

14. The control panel of claim 12, wherein the housing rear has indentations on both sides along the lateral housing sides, and wherein the accessory container is at the housing rear located between the indentations.

15. The control panel of claim 12, comprising an alphanumeric keyboard which is either receivable in the accessory container or placeable on the unfolded supports.

16. The control panel of claim 11,
wherein the horizontal handle has the form of a bridge handle with two ends connected to the housing front.

17. A control panel for a machine tool, the control panel comprising:
- a housing, the housing comprises a housing base part and a housing front part, which together define a housing interior, the housing defining a housing bottom side;
- a display fixed to the housing front part;
- a control element panel with control elements for the machine tool, the control element panel being fixed to the housing front part, and
- at least one hinge which pivotably connects the housing front part proximate to the housing bottom side to the housing base part in order to pivot the housing front part about a horizontal axis between a closed position and an open position with respect to the housing base part.

18. The control panel of claim 17, wherein the hinge is a miter hinge.

19. The control panel of claim 17, wherein the control element panel is arranged below the display and is inclined towards the display.

20. The control panel of claim 17, wherein the control element panel is arranged below the display and is inclined towards the display.

21. The control panel of claim 17,
wherein the control panel comprises at least one housing lock for fixing the housing front part in the closed position to the housing base part, and
wherein the housing lock has an actuating element which is arranged on an outside of the rear side of the housing base part facing away from the housing front part.

22. The control panel of claim 21, wherein the housing lock is a sash lock.

23. The control panel of claim 17, comprising a seal extending in the housing interior, which seal is effective in the closed position between the housing base part and the housing front part to prevent ingress of operating fluids and foreign substances.

24. The control panel of claim 23,
wherein the housing base part has a circumferential casing wall, and
wherein the seal is attached to a profile arranged in the housing interior and connected to the housing base part in such a way that the seal extends in the housing interior at a distance from the casing wall.

25. The control panel of claim 2,
wherein the at least one further control element arranged in at least one of the indentations is an enabling switch and/or a height adjustment key.

* * * * *